HIGH-SPEED MEMORY DEVICE WITH IMPROVED READ-STORE CIRCUITS

Filed May 1, 1967 4 Sheets-Sheet 1

INVENTOR

ALBERT W. VINAL

BY Thomas & Thomas

ATTORNEYS

HIGH-SPEED MEMORY DEVICE WITH IMPROVED READ-STORE CIRCUITS

Filed May 1, 1967

Dec. 30, 1969 A. W. VINAL 3,487,372

HIGH-SPEED MEMORY DEVICE WITH IMPROVED READ-STORE CIRCUITS

Filed May 1, 1967 4 Sheets-Sheet 4

United States Patent Office 3,487,372

Patented Dec. 30, 1969

3,487,372

HIGH-SPEED MEMORY DEVICE WITH IMPROVED READ-STORE CIRCUITS

Albert W. Vinal, Owego, N.Y., assignor to International Business Machines Corporation, Armonk, N.Y., a corporation of New York Filed May 1, 1967, Ser. No. 635,072

Int. Cl. G11b *13/00*

U.S. Cl. 340—172.5 11 Claims

ABSTRACT OF THE DISCLOSURE

A high-speed memory system of thin film magnetic elements has word conductors disposed according to one coordinate of the array and a plurality of transmission lines disposed according to a second coordinate of the array. Switch means isolates sensitive sense amplifiers during store operations, and a precisely timed strobe signal for the high-speed read operations is provided by signals from given storage locations in the array.

BACKGROUND OF THE INVENTION (1) This invention relates to high-speed memory devices which employ thin magnetic films for storage purposes and more particularly to high-speed circuit arrangements for executing read and store operations which use common circuitry in part, thereby to effect economies without sacrificing speed of operation.

(2) In high-speed memory devices it is important to provide storage elements which can be rapidly manipulated to perform store or read operations. Thin magnetic film storage arrangements are capable of much greater speeds of operation than magnetic core memory devices. As memory devices are developed which have increasingly higher speeds of operation it becomes exceedingly more important to use electrical circuits which have a rapid response to input control signals and a fast recovery time, the ability of a circuit to return to a condition where it may be employed again to perform its assigned function. It is often the case that increased speed of operation of a memory system is obtained at the expense of considerable increase in hardware. These and other problem aspects of operating memory devices at higher speeds are discussed more fully in the following description.

SUMMARY OF THE INVENTION

It is a feature of this invention, therefore, to overcome the foregoing and other problems by providing an improved high-speed memory device which utilizes thin magnetic films disposed in an array with read and store operations using common circuitry in part, thereby minimizing the complexity and hence costs.

It is a feature of this invention to provide an improved high-speed memory device which utilizes a plurality of parallel transmission lines, disposed according to one coordinate of an array, as a part of a driver circuit during store operations and as part of a sense circuit during read operations.

It is a feature of this invention to provide an improved memory device utilizing thin magnetic film elements disposed in an array with a plurality of parallel transmission lines disposed according to one coordinate of the array, using the parallel transmission lines as part of a driver during store operations and as part of a sense circuit during read operations, and terminating the parallel transmission lines at each end in the characteristic impedance, thereby to prevent reflected waves on the parallel transmission lines.

It is a feature of this invention to provide a high-speed memory device which utilizes thin magnetic film storage elements disposed in an array, word lines disposed according to one coordinate of the array, parallel transmission lines disposed according to another coordinate of the array, an additional parallel transmission line having information stored therein permanently which is read during each read operation to provide a strobe signal at the proper time to sense data signals.

It is another feature of this invention to provide a novel memory arrangement including thin magnetic film elements disposed in an array, parallel transmission lines disposed according to one coordinate of the array, bit drivers connected to one end of each parallel transmission line, switch means connected to the opposite end of each parallel transmission line, sense means connected to the switch means of each parallel transmission line, control means connected to the driver means and the switch means for deconditioning the switch means each time the driver means is operated, thereby to prevent the sense amplifier means from being saturated and hence delaying the time when a read operation might commence subsequent to a store operation.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
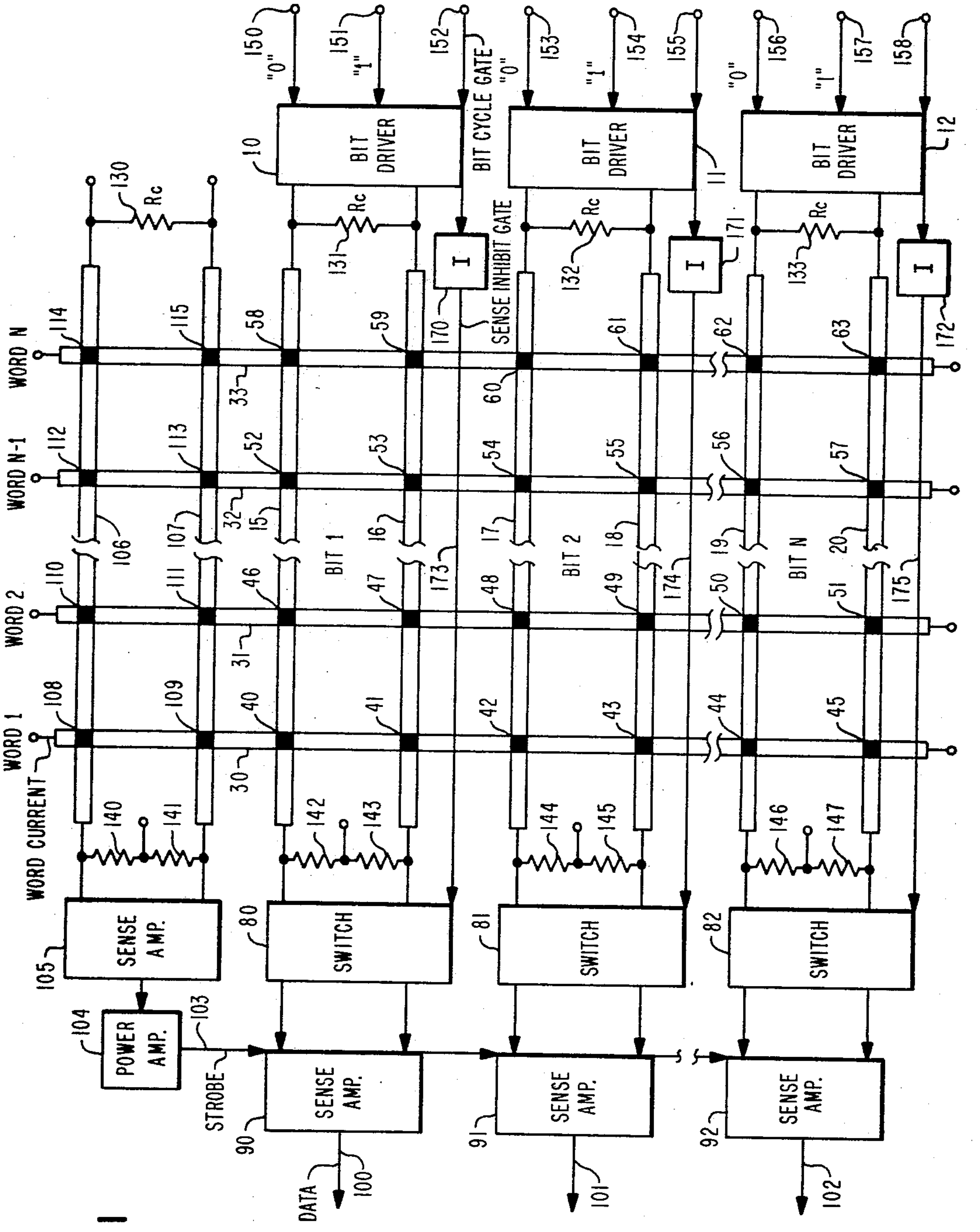
FIGURE 1 illustrates a two dimensional memory system arrangement according to this invention.

Reference is made first to FIGURE 1 which illustrates a system arrangement according to this invention. The memory system in FIGURE 1 includes bit drivers 10, 11 and 12 connected to respectively bit lines 15 through 20 as shown. The pair of lines 15 and 16 store bit 1 of all words. The bit lines 17 and 18 store bit 2 of all words, and the bit lines 19 and 20 store bit N of all words. Word lines 30 through 33 are disposed as shown. When a word current is supplied to a selected word line, information may be read from the selected word during a read operation, or information may be written in the selected word during a store operation. Each binary bit utilizes two separate storage areas. For example, bit 1 of word 1 includes the storage areas 40, 41 and bit 2 of word 1 includes the storage areas 42, 43 and bit N of word 1 includes the storage areas 44, 45. In like fashion the areas 46 through 51 are utilized to store the bits of word 2, and the storage areas 52 through 57 are used to store the bits of word N–1. Also, the storage areas 58 through 63 are utilized to store the bits of word N.

The lines 15 and 16 constitute a parallel transmission line. In like fashion the lines 17, 18 and the lines 19, 20 constitute parallel transmission lines. The transmission line formed by strip conductors 15, 16 is connected to a switch 80, and the transmission line 17, 18 is connected to a switch 81. In like fashion the transmission line 19, 20 is connected to a switch 82. The switches 80 through 82 are connected to associated sense amplifiers 90 through 92. The outputs from the sense amplifiers 90 through 92 on corresponding output lines 100 through 102 represent data read from a selected word. The sense amplifiers 90 through 92 are strobed during a reading operation by a pulse signal on a line 103 from a power amplifier 104. The power amplifier 104 receives a strobe signal from a sense amplifier 105 which is energized by signals on the parallel transmission line 106, 107 in each instance when one of the word lines 30 through 33 is energized with a current. If the word line 30 is energized, storage areas 108 and 109 supply a signal along the transmission line 106, 107 to the sense amplifier 105. In like fashion when the word line 31 is energized with a current, the storage areas 110, 111 are read, and the transmission line 106, 107 supplies a strobe signal to the sense amplifier 105. The storage areas 112, 113 are read whenever the word line 32 is selected, and the storage areas 114, 115 are read when the word line 33 is selected. If the word line 32 or the word line 33 is energized with a current, a signal induced in the transmission line 106, 107 is propagated therealong to the sense amplifier 105, and the output from the sense amplifier 105 operates the power amplifier 104 to provide a strobe signal. The transmission line 106, 107 and the word lines 30 through 33 in conjunction with the storage areas 108 through 115 serve as a control signal generator to provide a strobe signal which occurs at different times in various memory cycles for reasons explained more fully hereinafter.

The transmission lines are terminated on each end in their characteristic impedance to prevent line reflections for reasons which are likewise discussed more thoroughly subsequently. For this purpose the resistors 130 through 133 are provided on the right-hand end of the parallel transmission lines. A pair of resistors 140, 141 are connected across the left-hand end of the transmission line 106, 107. The pair of resistors 140 and 141 equals the characteristic impedance of the parallel transmission line 106, 107. The transmission lines 15 through 20 are terminated on the left-hand end by associated pairs of the resistors 142 through 147 as shown. Each pair of resistors equals the characteristic impedance of the associated transmission line.

When a write operation is performed, control and data signals are supplied to the input lines 150 through 158 to the associated bit drivers 10 through 12. The bit drivers are activated by control signals supplied to the lines 152, 155 and 158 of association bit drivers 10 through 12. Binary data signals representing zero or one are applied to the associated data input terminals of each bit driver. To illustrate, if a zero is to be written into bit 1 of the selected word during a store operation, the terminal 150 is energized; whereas, if a binary one is to be written into bit 1, the terminal 151 is energized. The control signals on the lines 152, 155 and 158 are supplied to the bit drivers 10 through 12 during a store operation, and these control signals are supplied through respective inverters 170, 171 and 172 and associated lines 173, 174 and 175 to corresponding switches 80 through 82. The control signal termed BIT CYCLE GATE is applied to the terminals 152, 155 and 158 to operate the associated bit drivers 10 through 12, and simultaneously these control signals are inverted by the associated inverters 170 through 172 to supply a control signal which deactivates the associated switches 80 through 82 during a write operation, thereby to protect the sensitive sense amplifiers 90 through 92 from the relatively large surges of power supplied to the parallel transmission lines during a store operation. The output signals from the inverters 170 through 172 on associated lines 173 through 175 are termed SENSE INHIBIT GATE signals. The timing relationship of the signals involved is noteworthy. The power surge on the transmission lines is delayed a finite time before reaching the switches. The Sense Inhibit Gate signal is thus able to turn the associated switch off before the propagated power surge arrives at the switch. This permits the use of switches having a slower response characteristic.

Figure 2:
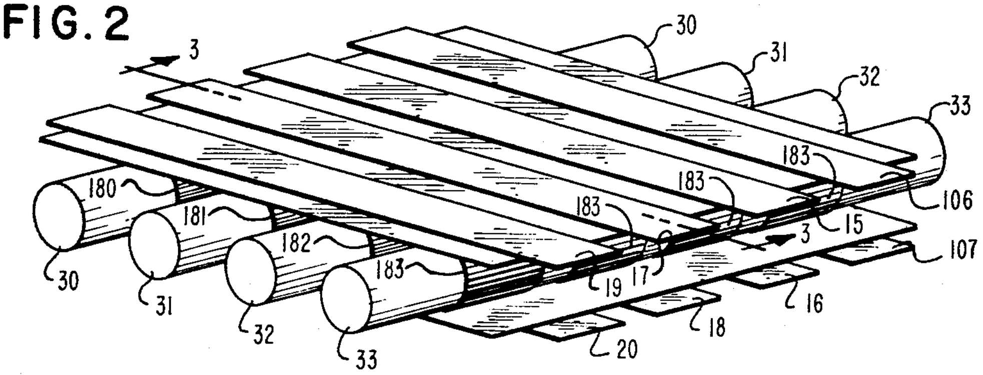
FIGURE 2 illustrates one suitable arrangement of a memory array utilizing bit strip transmission lines suitably arranged with cylindrical thin magnetic film elements in an array.
Figure 3:
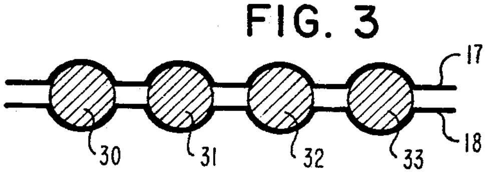
FIGURE 3 is a sectional view taken along the line 3—3 in FIGURE 2 of a modified memory arrangement.

The memory arrays of this invention utilize high-speed magnetic elements and more particularly thin magnetic film elements and more particularly thin magnetic film elements adaptable to configurations wherein the bit-sense means forms a continuous transmission line with conductive axis disposed at right angles to the word conductive means and the easy axis of the magnetic film areas. For convenience, the bit-sense conductive means is referred to as Bit Strip Transmission Line, abbreviated BST. A BST memory may take various forms, and one suitable arrangement is illustrated in FIGURE 2 as a two dimensional matrix array having four vertical conductors with magnetic film elements attached thereto and four pairs of horizontal conductors which constitute the bit strip transmission lines. For ease of correlating the construction in FIGURE 2 with the diagrammatic representation of the matrix array in FIGURE 1, like reference numerals are employed on corresponding parts in both figures. The transmission lines 15 through 20, 106 and 107 are arranged as shown with word conductors 30 through 33 disposed therebetween in the manner illustrated. Magnetic film areas 183 are disposed around the word conductor 33 longitudinally therealong between and registered with the parallel lines 15 through 20, 106 and 107. The word lines 30 through 32 have associated cylindrical magnetic film areas 180 through 182 disposed therealong in like fashion. These cylindrical film areas provide the magnetic storage areas similar in function as those diagrammatically represented by the blackened rectangles in the two dimensional coordinate array of FIGURE 1. The pairs of conductors forming the bit strip transmission lines in FIGURE 1 and FIGURE 2 are depicted as being straight, but they may take various forms. For example, the bit strip lines may be configured as illustrated in FIGURE 3. FIGURE 3 represents a view of a modified arrangement looking in the direction of the arrows along the line 33 in FIGURE 2. Note that the transmission line formed by conductors 17 and 18 are arranged to conform to the contour of the word conductors 30 through 33 with a reduced space separating the conductive strips. Other bit strip transmission line configuration may be employed.

Figure 4:
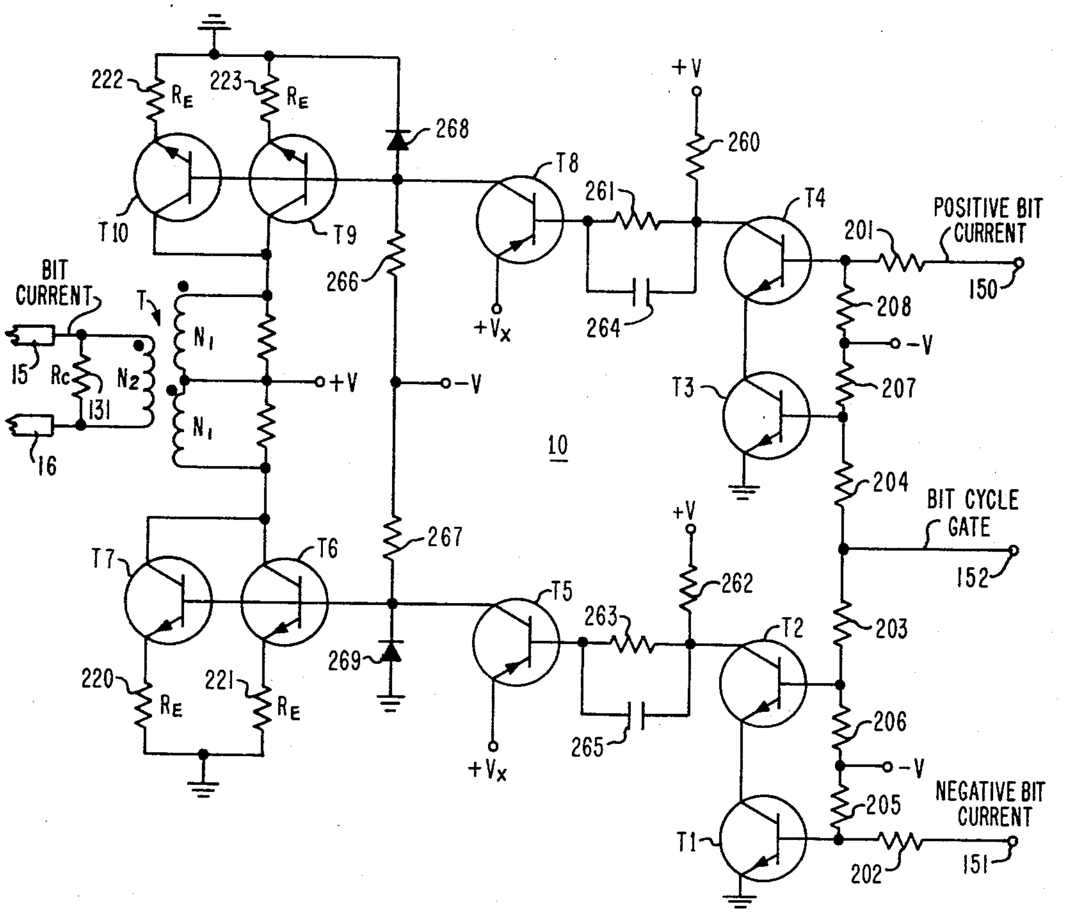
FIGURE 4 illustrates in detail one suitable arrangement of a bit driver shown in block form in FIGURE 1.

Reference is made next to FIGURE 4 which illustrates the detailed circuit arrangement of a bit driver shown in block form in FIGURE 1. The bit driver in FIGURE 4 is arbitrarily designated the bit driver 10 in FIGURE 1. The input terminals 150, 151 and 152 in FIGURE 4 are connected through resistors to transistors T1, T2, T3 and T4 as shown. The terminals 150 is connected through a resistor 201 to the transistor T4, and the input terminal 151 is connected through a resistor 202 to the base of the transistor T1. The input terminal 152 is connected through a resistor 203 to the base of a transistor T2, and this terminal is also connected through a resistor 204 to the base of the transistor T3. The base electrodes of transistors T1 and T2 are connected through respective resistors 205 and 206 to a source of operating potential. In like fashion the base electrodes of the transistors T3 and T4 are connected through respective resistors 207 and 208 to a source of operating potential. The transistors T1 and T2 serve as an And circuit, and the transistors T3 and T4 serve as another And Circuit. When a positive bit current gate is supplied to the terminal 151 and a Bit Cycle Gate pulse is supplied to the terminal 152, the And circuit constituted by the transistors T1 and T2 is operated. When the And circuit T1, T2 is operated, the transistor T5 conducts, and the voltage $V_x$ is supplied to the base of transistors T6 and T7. The collector current of the transistors T6, T7 is substantially equal to $V_x/R_e$. The transistors T6 and T7 serve as a current amplifier. They respond to current from the source $V_x$ and supply a current to the lower half of the primary winding of a transformer T. The magnitude of this current is substantially equal to the number of transistors (T6, T7, etc.) connected in parallel times the current $X_x/R_e$. The current in the lower half of the primary winding of the transformer T induces a current in the secondary winding of this transformer in one direction. This current is supplied to the transmission lines 15 and 16 in a direction which causes a binary one to be written in the selected bit location.

When a positive bit pulse is supplied to the terminal 150 and a Bit Cycle Gate pulse is supplied to the terminal 152, the And circuit constituted by the transistors T3, T4 is operated. When the transistors T3 and T4 conduct, a transistor T8 conducts, and a voltage $V_x$ is applied to the base of transistors T9 and T10 which in turn supply a current through the upper halft of the primary winding of the transformer T. The collector current of each of the transistors T9 and T10 is substantially equal to $V_x/R_e$. The transistors T9 and T10 serve as a current amplifier. They respond to current from the source $V_x$ and supply a current to the upper half of the primary of transformer T which has a magnitude equal to the number of the transistors (T9, T10, etc.) times the current $V_x/R_e$. A current is supplied to the upper half of the primary of transformer T which is substantially equal to that previously generated in the lower half of the primary by the transistors T6 and T7. The current in the upper half of the primary of the transformer T induces a current in the secondary which is supplied to the transmission lines 15 and 16 to write a binary zero in the selected bit location. Current is supplied to one-half only of the primary winding at any given time. Resistors 220 through 223 are substantially identical in value. Thus the current supplied to the upper half and the current supplied to the lower half of the transformer T are substantially equal in value, and the currents consequently induced in the secondary winding are equal in magnitude but opposite in direction. Thus currents of equal magnitude are employed to write a binary one or a binary zero, but they are reversed in direction.

A source of operating potential is connected through resistors 260 and 261 to the base of transistor T8. A source of operating potential is connected through resistors 262 and 263 to the base of transistor T5. Condensers 264 and 265 are connected across respective resistors 261 and 263 as shown. Resistor 266 and 267 and diodes 268 and 269 are connected as shown to a source of potential —V.

Figure 5:
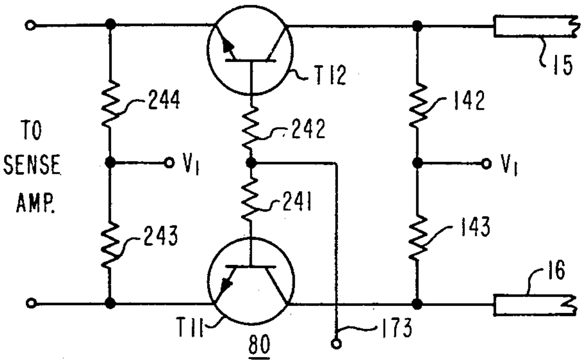
FIGURE 5 illustrates in detail one suitable switch arrangement shown in block form in FIGURE 1.

Reference is made next to FIGURE 5 which shows in detail a switch of the type which may be employed for those shown in block form in FIGURE 1. The switch in FIGURE 5 is arbitrarily designated as the switch 80 in FIGURE 1. Signals on the transmission lines 15 and 16 are normally passed by the transistors T11 and T12 in FIGURE 5 to the sense amplifier 90 in FIGURE 1. It is the function of the switch 80 to convey signals on the transmission lines 15 and 16 to the sense amplifier 90 during read operations. The common use of the transmission lines 15 and 16 for data read and data store operations involves supplying relatively large amounts of power to these lines by the bit driver for a store operation on the one hand and detecting relatively small signals by the sense amplifier during a read operation on the other hand. More specifically, a differential signal of considerable magnitude might be presented to each sense amplifier during the time interval in which a bit driver signal is applied during store operations. This condition could cause extreme saturation of the sense amplifiers, where saturation is generally defined as excess charge build-up between collector and emitter electrodes of transistors involved. This results in loss of effective memory speed because the recovery time, the time to dissipate the excess charge, delays the memory operation if a read operation follows a store operation. To minimize this problem, several things are done. First, the bit drivers and the sense amplifiers are connected to opposite ends of the transmissions lines. Second, the problem is further minimized by opening the switch to detach or isolate the sense amplifier from the transmission lines whenever relatively large amounts of energy are supplied to the transmission lines by the bit driver during a store operation. Third, by using the same control to operate the switch and the bit driver, the switch operation is initiated early, thereby permitting a slower response switch to serve effectively as pointed out earlier. Note that the switch need not operate until the control signal operates the bit driver and its output propagates down the transmission lines to the switch. These considerations are important in high-speed memory devices where reducing the response time of a circuit a few nanoseconds may reduce costs substantially in many instances.

The resistors 142 and 143 in FIGURE 5 have a combined value equal to the characteristic impedance of the transmission lines 15, 16. Signals on the line 173 from the invertor 170 in FIGURE 1 are supplied through resistors 241 and 242 to the base electrodes of respective transistors T11 and T12. Operating potential is supplied to the emitter electrodes of the transistors T11 and T12 through respective resistors 243 and 244. Whenever a store operation is to be performed, a signal is supplied on the line 152 in FIGURE 1 to the bit driver 10 and to the invertor 170. The control signal on the line 152 is inverted by the inverter 170 in FIGURE 1 and supplied on the line 173 to the base electrodes of the transistors T11 and T12 in FIGURE 5. The signal level on the line 173 renders the transistors T11 and T12 nonconductive, thereby disconnecting the transmission line 15, 16 from the sense amplifier 90 in FIGURE 1 for the duration of the control signal applied to the line 152.

The sense amplifiers in FIGURE 1 are differential amplifiers, and any one of various suitable varieties may be employed. One such arrangement is described and illustrated in FIGURE 3 of application Ser. No. 380,261, filed July 6, 1964 for Electrical Switching Apparatus by Albert W. Vinal which is assigned to the assignee of this invention.

In order to portray better the improvements according to this invention, additional background material is presented at this point. An important aspect of thin magnetic film memory devices over magnetic core memory devices is the potential for much higher operating speeds. Of the selection schemes available for selecting or addressing the thin magnetic film memory devices, the linear selection (two dimensional) system offers the greatest promise for realizing these potential speed advantages. However, this form of memory selection has several undesirable factors. First, the word selection hardware is much greater than that required to operate a slower three-dimensional memory system. Second, the memory system reliability may be undesirably affected by the propagation delay characteristics of the sense conductive transmission lines. The significance of this propagation delay in a high-speed film memory may be more deleterious to proper memory design than for three dimensional or two dimensional ferrite core memories. Various critical characteristics determine the practicability of a thin magnetic film memory device, and these factors are dominated by the properties and constraints imposed by the conductive film construction such as illustrated in FIGURE 2 above. Perhaps the most important considerations relative to memory design stem from the signal transmission characteristics of each bit-sense loop which is composed of a pair of parallel conductive strip lines in this case. These critical characteristics are tabulated as follows:

(A) High degree of balance in the sense system required in order to virtually eliminate differential mode signal injection during word selection time.

(B) Transmission line cut off frequency $$F_{co}=\frac{1}{\pi\sqrt{LC}}$$

(C) Ratio of signal propagation time to signal response time, defined as R.

(D) Signal attenuation.

(E) Quality of sense loop characteristic impedance.

Figures 6, 7, 8, 9:
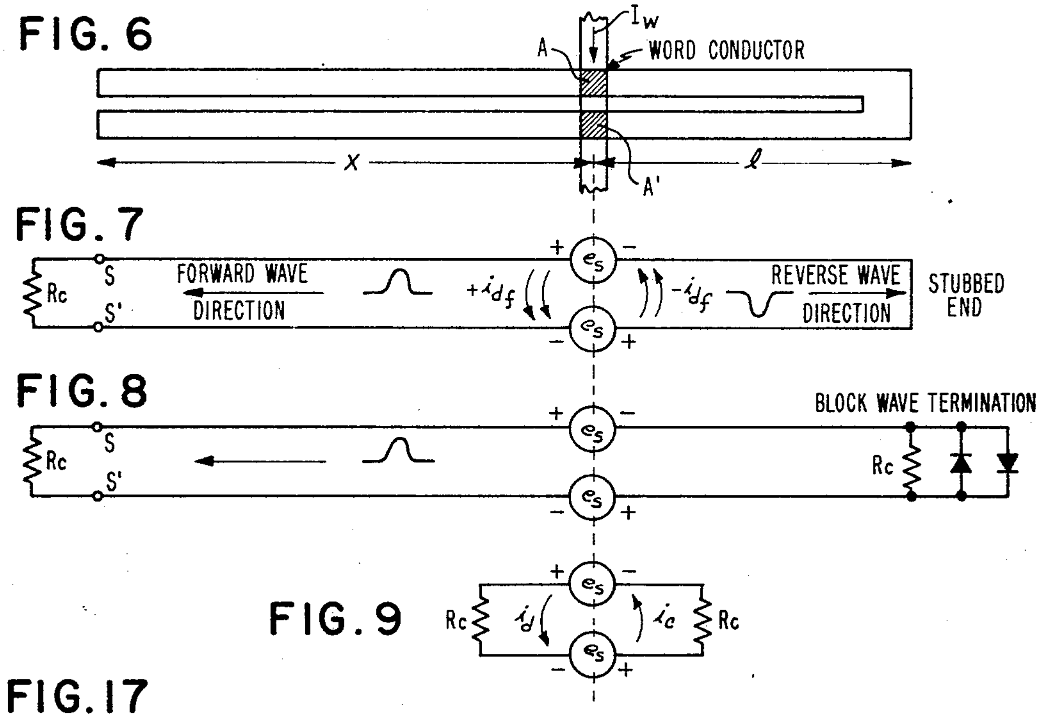
FIGURE 6 illustrates a partial storage device showing a single transmission line and a single word conductor with a pair of storage areas.
FIGURES 7, 8 and 9 are idealized representations useful in explaining the circuit arrangement in FIGURE 6.

Relative to criteria above, the signal transmission properties of the BST memory are considered next. Compared to other high-speed film memory devices, BST memory configurations offer relatively large, fast signals and a relatively large number of words per unit length of the bit strip tape. FIGURE 6 represents a bit strip sense loop system forming a transmission line of length $l$. This sense system is balanced, and consequently it is essentially devoid of differential noise injection during word selection time. FIGURE 7 is an idealized version of the equivalent bit strip sense loop of FIGURE 6. The signal voltages developed at storage areas A and A' in FIGURE 6 are represented as theoretical voltage generators in FIGURE 7 through 9. The location of these voltage generators, defined by distance X from terminals S and S', correspond in position to a specified word conductor being selectively energized. It is not possible to represent in the drawing the density of the theoretical voltage generators, but there may be as many as 100 word conductors per inch. It is assumed for purposes of discussion that the transmission line of FIGURE 7 possesses ideal properties. Of first concern is the determination of whether the signal energy propagation delay along a finite line 1 of the bit strip tape will be longer in duration than the signal response being propagated. Let it be assumed that the influence of the dielectric material and the presence of magnetic films limit the propagation velocity $V_p$ of the signal energy to approximately ⅓ of the free space velocity of light C.

This assumption leads to a propagation velocity of:

$$V_p \approx .33 \text{ ft./nsec.} \quad (1)$$

or the travel time $T_t$ per foot as $$T_t \approx 3\text{nsec./ft.} \quad (2)$$

It is assumed that the signal response switch time $T_s$ will be in the order of 10 nanoseconds or less. In order to establish the resired ratio $R=T_t/T_s$ one must determine a practical length for the bit strip tape segment. In this regard a reasonable and useful storage module for some applications consists of 4096 words, each about 30 bits in length. One type of bit strip tape memory utilizes a tape 1" wide and 10' long to serve as the basic storage module. This size is based upon the need for approximately 33 words per inch of tape length. For this type memory the factor R was established as:

$$R=T_t/T_s=3$$

Sense segmenting into three groups of about 1500 words could lower R to unity, but this is not advisable because it radically increases the bit-sense instrumentation, particularly if the memory is operated in the destructive read out mode.

The case where R is >1 is usually true for all lower density storage systems such as flat film memories, and it is generally true for all high-speed memories in use. For three dimensional memories $R<1$ will usually be true. It can be shown that memory systems with $R>1$ can no longer depend upon a fixed time strobe pulse to improve signal to noise ratio. Furthermore, the requirements for bi-polar signals e.g. positive for binary one and negative for binary zero or vice versa, becomes a necessary criteria of the storage element. It can be shown as a practical matter that the sense means must be balanced with respect to the word select system and signal responsive elements. The fact that the BST sense system is balanced in this case is obvious. The effects of having $R>1$ relative to BST memory type operations can be defined qualitatively. Referring to FIGURE 7, the direction and polarity of a forward and backward wave is indicated. As shown, the sense amplifier end of this line is terminated in its characteristic impedance $R_c$. The opposite end of the line is illustrated as shorted in FIGURE 7 and terminated in FIGURE 8. When the backward directed signal energy, produced by the responsive signal developed by the identical storage areas A and A', reaches the shorted end of the line, a reflection is produced which contains components of the same polarity as the forward wave motion toward terminals S and S'. The arrival times of the forward and reflected back waves are a function of X and the velocity of propagation $V_p$. Furthermore, the unattenuated amplitude of each voltage pulse is equivalent to the response amplitude of a single storage area A or A'. The arrival times of the forward wave and back wave reflections at terminals S and S' are given in the following equations.

Forward wave:

$$Tf=X/V_p=T_tX \quad (3)$$

Reverse wave:

$$T_r=\frac{2l-X}{V_p}=(2l-X)T_t \quad (4)$$

It can be seen that the arrival time of the forward and reverse waves are identical for $X=l$, and the signal response unattenuated is $2e_s$. The sensible signal response for the forward and backward reflected waves as a function of word conductor position X is illustrated in FIGURES 10 through 15 for $X=0$, $X=l/2$, and $X=l$ for both the binary one and the binary zero states. It should be pointed out that these signal responses correspond to destructive read out memory operations. For the nondestructive read out mode of operation the trailing edge of the word pulse must be sloped off so as to eliminate the opposite polarity signal which otherwise would be present.

In systems such as this where $R>1$ will not permit use of fixed position strobe techniques, the dynamic strobe technique, wherein at least one of the bit strip loops or pair of transmission lines is employed as the basis for a strobe pulse generator, represents a novel answer. This dynamic strobe system generates a strobe trigger pulse occurring simultaneously with the time of arrival of the forward signal waves transmitted along the normal signal sense loop or pair of transmission lines independent of word conductor position X. For this technique, each of the sense amplifiers 90 through 92 must be provided a fixed delay relative to the strobe amplifier 104 of about 10nsec. The basic problem of signal detection without dynamic strobe becomes one of sensing signal polarity which occurs once in the interval $T_0<T_a<RT_s$ or twice in the interval of $T_0<T_a<2RT_s$. There are several fundamental requirements pertaining to adequate unstrobed signal detection. The most significant of these requirements are listed below:

(1) No differential noise injection during word select time.

(2) High quality sense transmission line impedance characteristics.

(3) Proper termination of sense loop transmission lines at input terminals of sense amplifiers.

(4) Signal characteristics of storage media must exhibit bi-polar signals i.e., positive signal for binary one and negative signal for binary zero or vice versa.

Effective satisfaction of these requirements eliminates the introduction of any significant negative going noise components during positive signal responses and positive noise components during negative signal responses. It is readily seen that the fourth requirement is satisfied in the bit strip tape memory since it is inherent in this type of storage device to obtain bi-polar signals as may be readily observed in FIGURES 10 through 15. Requirement (2) is one of the most difficult criteria to satisfy relative to bit strip tape memory arrangements. The quality of the bit sense strip loop as a transmission line of controlled impedance is intimately dependent upon the thickness of the bit strip tape central conductive film. Signal attenuation because of power losses for tape segments 10 feet long can be shown to be insignificant. The frequency and impedance characteristic of the bit strip are of more fundamental concern. The analytical approach to bit strip tape memory construction in terms of frequency and impedance characteristics of the bit strip loop present theroetical consideration which are quite complex.

Selection system considerations are discussed next. In this connection all practical high-speed memory systems require the response signal from the storage means to be bi-polar e.g. positive signal for binary one and negative signal for binary zero. Presently the only practical avoidance of this criteria lies in the use of dynamic strobing. The use of the dynamic strobbing technique with bi-polar signals can be particularly valuable in memory system design where duplex memories operate in the $\overline{\text{AND}}$ redundant mode.

A second factor equally significant to practical high-speed memory arrangements is the unidirectional word drive criteria. Like the bi-polar response signal property, unidirectional drive should be an inherent property of the basic storage element. It can be shown that the word energization hardware required by a bidirectional linear (or two-dimensional) word selection system renders such an approach impractical.

A third criteria arises from a practical definition of a high-speed non-destructive read (NDRO) memory element. This last criteria is unique only to the design advantages and operational flexibility characteristic of serial arithmetic processor systems. Specifically, a practical high-speed NDRO memory must posses the first two criteria above, and in addition, the unidirectional word pulse amplitude should be the same for both read and store functions. This criteria requires that storage of data correspond only to coincident application of word and bit energization. Word (vertical line) or bit (horizontal line) energization applied alone should not induce change or loss of stored information.

The BST memory arrangement is potentially very fast. Unlike three dimensional memory arrangements employing toroids or multiaperture devices, the BST memory requires the address selection matrix to be disposed external to the storage array. A direct consequence of external matrix selection is a significant hardware penalty as pointed out earlier. External matrix selection is often referred to as linear word selection or simply as two dimensional selection. Of the two-dimensional selection schemes available for use, the direct drive arrangement is preferred because of its practical and simple arrangement. The details of such a direct drive matrix system is illustrated and described in U.S. Patent 3,300,772. The direct drive technique consists of source switches and current sinks.

Figure 16:
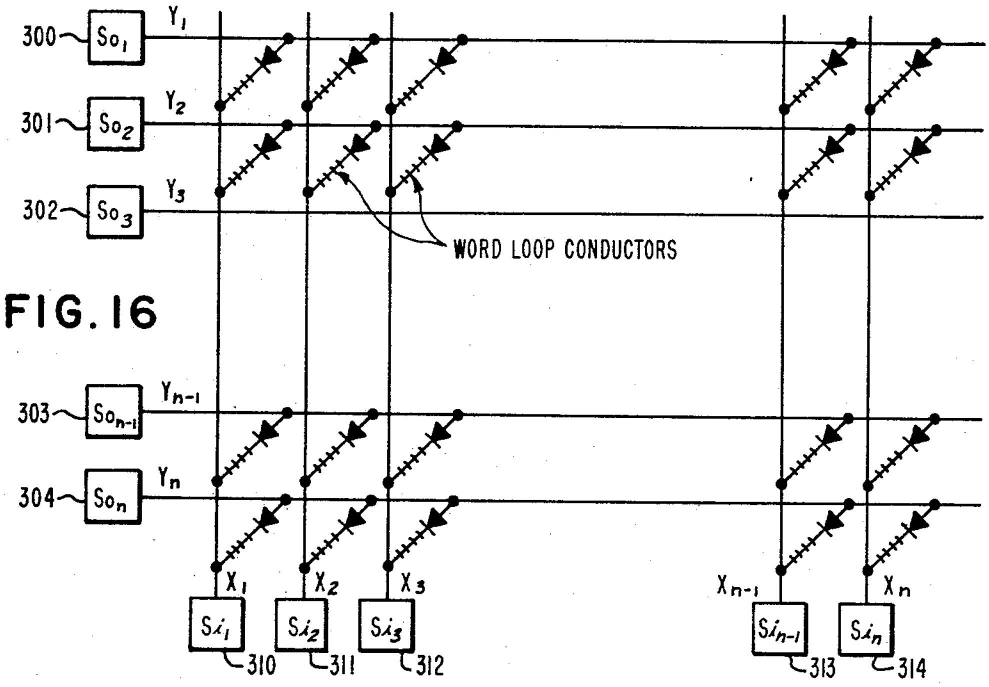
FIGURE 16 illustrates one suitable word selection device which may be utilized in connection with word selection in FIGURE 1.

FIGURE 16 depicts the general technology which is characteristic of direct drive matrix selection. The matrix arrangement illustrated in FIGURE 16 includes current sources 300 through 304 which are connected to supply currents to the horizontal lines of the selection matrix array, and current sinks 310 through 314 connected to the vertical lines of the selection matrix array for receiving currents. Disposed at the coordinate intersections of the matrix array are word loop conductors, such as the conductors 30 through 33 in FIGURE 1.

It is appropriate at this point to consider further the dynamic strobe technique. It was pointed out earlier that for all practical high-speed memories the delay coefficient R should be greater than unity. It was pointed out also that the use of a fixed position strobe is not feasible, and as a consequence, signal identification must be done strictly on an amplitude polarity basis. The transmission lines 106 and 107 plus their associated storage areas 108 through 115 serve the function of a dynamic strobe generator. The remaining bit strips 15 through 20 are used strictly for information storage. During the energization of a selected word conductor, a uni-polar signal voltage is developed in the strobe strips 106, 107 directly below the selected word conductor. Simultaneously data signal responses are developed below the same word conductor in each of the data strip loops defined by the transmission lines 15 through 20. The strobe and data signal responses, propagated along the transmission lines, arrive at the terminals of their respective sense amplifiers simultaneously irrespective of the selected word conductor position. To illustrate, for example, the strobe signal generated for word 1 arrives at the amplifier 105 earlier in its memory cycle than the strobe signal generated for word 2 in FIGURE 1. Likewise, the strobe signal for the word 2 arrives earlier than the strobe signal for the word N–1 in FIGURE 1. Thus it is seen that the dynamic strobe signal, generated when each word is selected, arrives ultimately on the line 103 to the sense amplifiers 90 through 92 in FIGURE 1 simultaneously as the data information is supplied to these sense amplifiers from the associated ones of the transmission lines 15 through 20. By appropriate selection of data and strobe signal amplifiers, automatic and precision strobing of each data bit is achieved, and this is achieved regardless of how much larger than unity R becomes. In this fashion dynamic strobing of the bit strip tape bi-polar signal response should provide effectively an infinite signal to noise ratio.

Figure 17:
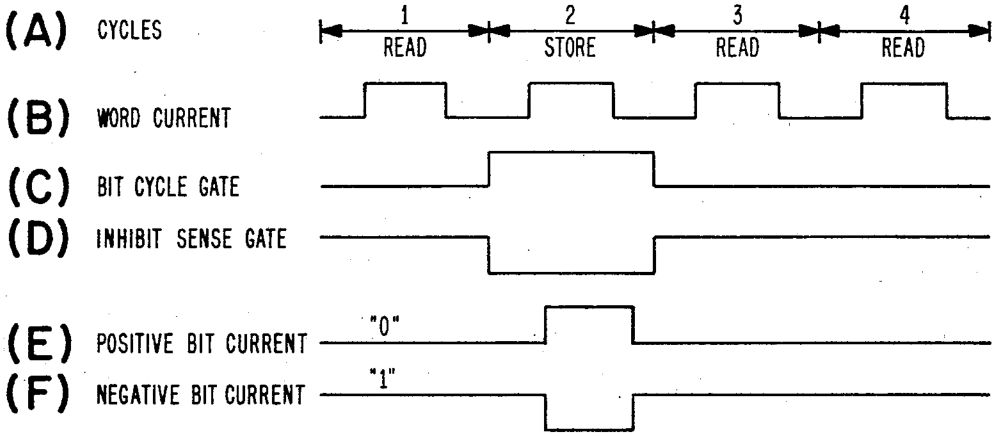
FIGURE 17 illustrates various wave forms which are useful in explaining the operation of the memory system in FIGURE 1.
Figure 10:
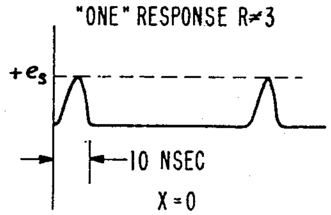
FIGURES 10 through 15 depict various wave forms which are useful in explaining the operation of the storage device depicted in FIGURES 1 and 6.
Figure 11:
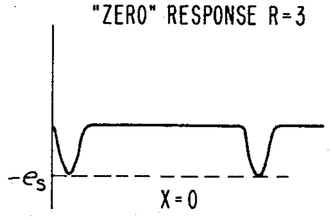
Figure 12:
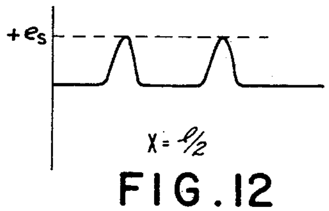
Figure 13:
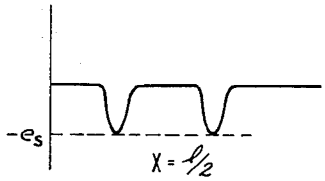
Figure 14:
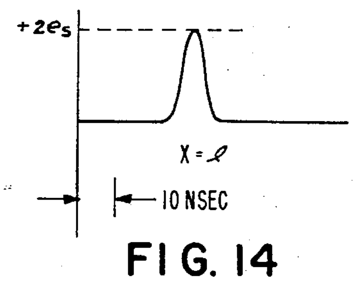
Figure 15:
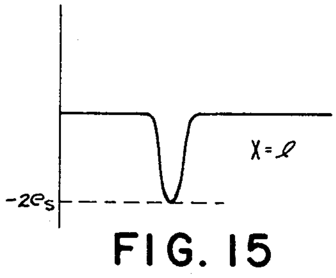

Reference is made next to FIGURE 17 which illustrates the timing relationships of signals utilized to perform read and store operations in the memory system of FIGURE 1. FIGURE 17(A) shows a plurality of successive memory cycles with cycles 1, 3 and 4 utilized for read operations and cycle 2 used for a store operation. For a read operation a word current is supplied to a selected one of the word lines 30 through 33 in FIGURE 1, and this current is sufficient to interrogate the storage areas. More specifically, the magnetic fields of the storage areas are varied in magnitude and direction sufficient to generate sensible currents which may be detected by the sense amplifiers 90 through 92 in FIGURE 1. The signals applied to these amplifiers are strobed by a signal on the line 103 which is appropriately timed for strobing purposes as explained earlier. Data is taken on the output lines 100 through 102 to a utilization device. Word currents are generated during each cycle as indicated by the wave form in FIGURE 17(B).

Whenever a store operation is to be performed, a bit cycle gate current is generated as illustrated in FIGURE 17(C), and this current is applied to each of the bit drivers 10 through 12 in FIGURE 1. The Bit Cycle Gate signal conditions the bit drivers to pass the appropriate binary one or binary zero data signals to associated transmission lines 15 through 20. Also, the Bit Cycle Gate signals supplied to the lines 152, 155 and 158 are supplied to respective inverters 170 through 172. The outputs of the inverters, labeled Inhibit Sense Gate, decondition the switches 80 through 82, thereby to isolate or disconnect the sense amplifiers 90 through 92 from the transmission lines 15 through 20 before they are saturated by the output signals from the bit drivers 10 through 12. Data signals representing the bits of a word to be written are supplied to corresponding bit drivers 10 through 12. A positive bit current, representing a binary zero, is supplied to the upper terminals 150, 153 and 156 of respective bit drivers 10 through 12 to write a binary zero, and a negative bit current is supplied to terminals 151, 154 and 157 of respective bit drivers 10 through 12 to write a binary one. As illustrated more specifically in FIGURE 4, the positive bit current is supplied to the terminal 150 to write a binary zero and a negative bit current is supplied to the terminal 151 to write a binary one. The Bit Cycle Gate current is applied to the terminal 152 in FIGURE 4 during a store operation. A binary zero signal and a binary one signal are illustrated in respective FIGURES 17(E) and 17(F). It is pointed out that current in one direction represents a binary zero and current in the opposite direction represents a binary one. The selection of the terms positive and negative for current direction to represent binary one or binary zero is arbitrary.

During the period of time when the positive and negative bit currents are applied to the bit drivers 10 through 12 in FIGURE 1, a word current is supplied to the selected one of the word lines 30 through 33 in FIGURE 1. The bit currents on the transmission lines 15 through 20 in combination with the current of the selected one of the word lines 30 through 33 create combined magneto motive forces at the storage areas of the selected word to write the new information, thereby destroying old information previously stored therein. The positive and negative bit current are terminated at the time illustrated in FIGURES 17(E) and 17(F). Subsequently, the Bit Cycle Gate is terminated, as illustrated in FIGURE 17(C). At this time the inverters 170 through 172 supply a signal to the switches 80 through 82 which restores them to the on condition, thereby connecting the transmission lines 15 through 20 to the associated sense amplifiers 90 through 92. This terminates the store cycle which is illustrated as the second memory cycle in FIGURE 17(A). The store cycle may be followed by a read cycle or another store cycle, and the subsequent memory cycle may involve the same or another word location. Numerous read cycles may be performed without destroying the stored data. When it is necessary to change information in a selected word, a store cycle is used, and read cycles continue until further store cycles are required.

While the invention has been particularly shown and described with reference to a preferred embodiment thereof, it will be understood by those skilled in the art that various changes in form and details may be made therein without departing from the spirit and scope of the invention.

What is claimed is:

1. A memory configuration or system including a plurality of thin magnetic film areas defining storage locations, transmission lines disposed adjacent said storage locations for reading and storing information in said storage locations, driver mean connected to one end of each of the transmission lines for supplying data signals for store operations, sense means and switch means connected in series with the switch means connected to the other end of each of the transmission lines for sensing data signals during read operations, signal means connected to said driver means and said switch means which simultaneously opens the switch means and operates the driver means during a store operation, thereby isolating said sense means from said transmission lines during store operation and preventing temporary saturation of the sense means, and additional conductor means disposed adjacent said storage locations which is energized with signals to perform read and store operations.

2. The apparatus of claim 1 wherein given storage locations hold a given binary bit which remains unchanged, and amplifier means responsive to binary signals read from said given storage locations for supplying a strobe signal to said sense means.

3. A memory configuration or system including a plurality of thin magnetic film areas defining storage locations, transmission lines disposed adjacent said storage locations for reading and storing information in said storage locations, driver mean connected to one end of each of the transmission lines for supplying data signals for store operations, sense means and switch means connected in series with the switch means connected to the other end of each of the transmission lines for sensing data signals during read operations, signal means connected to said driver means and said switch means which simultaneously opens the switch means and operates the driver means during a store operation, thereby isolating said sense means from said transmission lines during store operation and preventing temporary saturation of the sense means, additional conductor means disposed adjacent said storage locations which is energized with signals to perform read and store operations, and said transmission lines are pairs of conductive strip lines and each pair of lines is terminated at each end in its characteristic impedance, thereby to prevent reflected waves on said pairs of lines.

4. The apparatus of claim 3 wherein the signal means includes pulse source means connected directly to said driver means, inverter means connected between said pulse source means and said switch means thereby to insure that said switch means is deactivated whenever said driver means is operated.

5. The apparatus of claim 3 wherein given storage locations hold a given binary bit which remains unchanged, and amplifier means responsive to binary signals read from said given storage locations for supplying a stobe signal to said sense means.

6. A memory configuration including a group of word lines disposed according to one coordinate of an array, a group of pairs of parallel conductors forming the bit strip transmission lines disposed according to another coordinate of an array, a plurality of thin film memory areas, said thin film memory areas being disposed at coordinate insersections of said word lines and parallel bit strip transmission lines, a bit driver connected to one end of each transmission line for supplying signals representing binary data thereto during store operations, a sense amplifier for each bit strip transmission line, switch means disposed between each sense amplifier and the associated bit strip transmission line, said switch means being connected to the end of the bit strip transmission line opposite the bit drivers, first means connected to said bit drivers for supplying binary data signals thereto for store operations, second means connected to the bit drivers and the switch means for deconditioning the switch means for opening the bit drivers to supply signals representing binary data to said bit strip transmission line, said second means including pulse source means connected directly to said bit drivers, and inverter means connected between said pulse source means and said switch means, thereby to insure that said switch means is deactivated whenever said bit drivers are operated.

7. The apparatus of claim 6 wherein each said parallel bit strip transmission line is terminated at each end in its characteristic impedance, thereby to prevent reflected waves on each of said bit strip transmission lines.

8. The apparatus of claim 6 including an additional bit strip transmission line for control purposes, a plurality of thin film magnetic areas being disposed at the coordinate intersections of said word lines and said additional bit strip transmission line and given binary signals permanently stored at the said coordinate intersections of said word lines and said additional bit strip transmission line, sense means connected to one end of said additional bit strip transmission line, said sense means being connected to the end of the additional bit strip transmission line which corresponds to the end of the remaining parallel bit strip transmission lines to which the sense amplifiers are connected, said sense means having an output signal connected to said sense amplifiers, said output signal serving as a strobe to operate said sense amplifiers at a point in the memory read operation to sense correctly the stored data.

9. A memory configuration including a group of word lines disposed according to one coordinate of an array, a group of pairs of parallel conductors forming the bit strip transmission lines disposed according to another coordinate of an array, a plurality of thin film memory areas, said thin film memory areas being disposed at coordinate intersections of said word lines and parallel bit strip transmission lines, a bit driver connected to one end of each transmission line for supplying signals representing binary data thereto during store operations, a sense amplifier for each bit strip transmission line, switch means disposed between each sense amplifier and the associated bit strip transmission line, said switch means being connected to the end of the bit strip transmission line opposite the bit drivers, first means connected to said bit drivers for supplying binary data signals thereto for store operations, and second means connected to the bit drivers and the switch means for deconditioning the switch means and for operating the bit drivers to supply signals representing binary data to said bit strip transmission line.

10. A memory configuration including a group of word lines disposed according to one coordinate of an array, a group of bit strip transmission lines disposed according to another coordinate of an array, a plurality of high-speed memory elements being dis posed at coordinate intersections of said word lines and bit strip transmission lines, a bit driver connected to one end of each bit strip transmission line for supplying signals representing binary data thereto during store operations, a sense amplifier for each bit strip transmission line, switch means disposed between each sense amplifier and the associated bit strip transmission line, and switch means being connected to the end of the bit strip transmission line opposite the bit drivers, first means connected to said bit drivers for supplying binary data signals thereto for store operations, second means connected to the bit drivers and the switch means for deconditioning the switch means and for operating the bit drivers to supply signals representing binary data to each of said bit strip transmission lines, and impedance means terminating each bit strip transmission line in its characteristic impedance on each end thereof, whereby reflections on each of the transmission lines are prevented.

11. A memory configuration including a group of word lines disposed according to one coordinate of an array for reading stored words, a group of bit strip transmission lines disposed according to another coordinate of an array, a plurality of thin magnetic film areas, said magnetic film areas being disposed at coordinate intersections of said word lines and the bit strip transmission lines, a bit driver connected to one end of each bit strip transmission line for supplying signals representing binary data thereto during store operations, a sense amplifier for each bit strip transmission line, switch means disposed between each sense amplifier and the associated bit strip transmission line, said switch means being connected to the end of each bit strip transmission line opposite the bit drivers, first means connected to said bit drivers for supplying binary data signals thereto for store operations, second means connected to the bit drivers and the switch means for deconditioning the switch means and for operating the bit drivers to supply signals representing binary data to said bit strip transmission lines, impedance means terminating each bit strip transmission line in its characteristic impedance on each end thereof, dynamic strobe generator means including an additional bit strip transmission line and an additional storage location in each stored word for storing a given binary signal, means to read said given binary signal during each read operation and couple the same as a strobe signal to said sense amplifier for each pair of parallel transmission lines.

References Cited

UNITED STATES PATENTS

| | | | |
|---|---|---|---|
| 3,069,660 | 12/1962 | Wright et al. | 340—173 |
| 3,191,156 | 6/1965 | Roth | 340—172.5 |
| 3,332,066 | 7/1967 | Correll et al. | 340—172.5 |
| 3,376,555 | 4/1968 | Crane et al. | 340—172.5 |
| 3,402,399 | 9/1968 | Bragg | 340—173.1 |

PAUL J. HENON, Primary Examiner

RONALD F. CHAPURAN, Assistant Examiner

U.S. Cl. X.R.

340—173